W. E. GRAHAM.
LAWN MOWER.
APPLICATION FILED SEPT. 10, 1910.
1,036,608.
Patented Aug. 27, 1912.
2 SHEETS—SHEET 1.
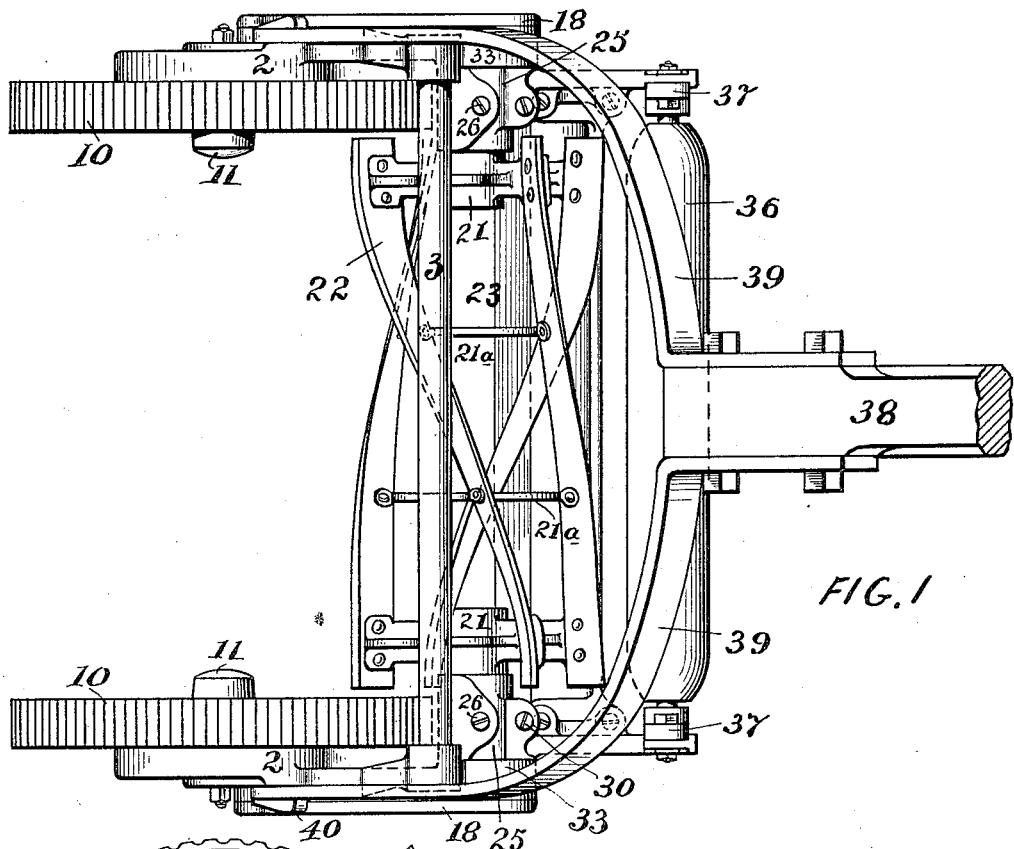
FIG. 1
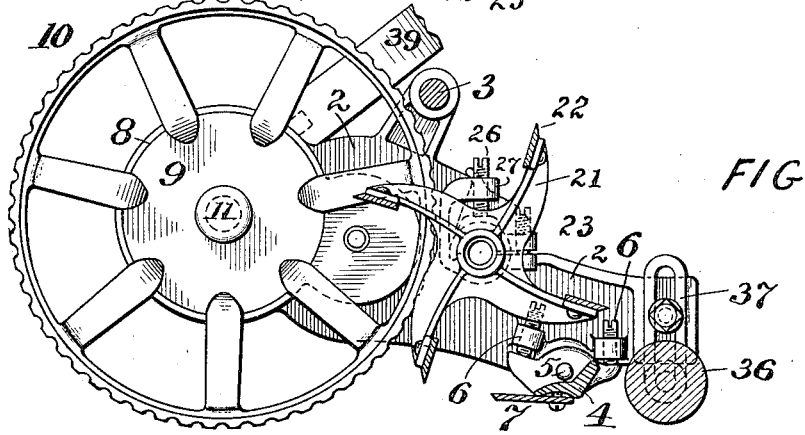
FIG. 2
Witnesses
Daniel Webster, Jr
E. H. Barlow.
Inventor
Walter E. Graham
By 
Attorney
COLUMBIA PLANOGRAPH CO., WASHINGTON, D. C.

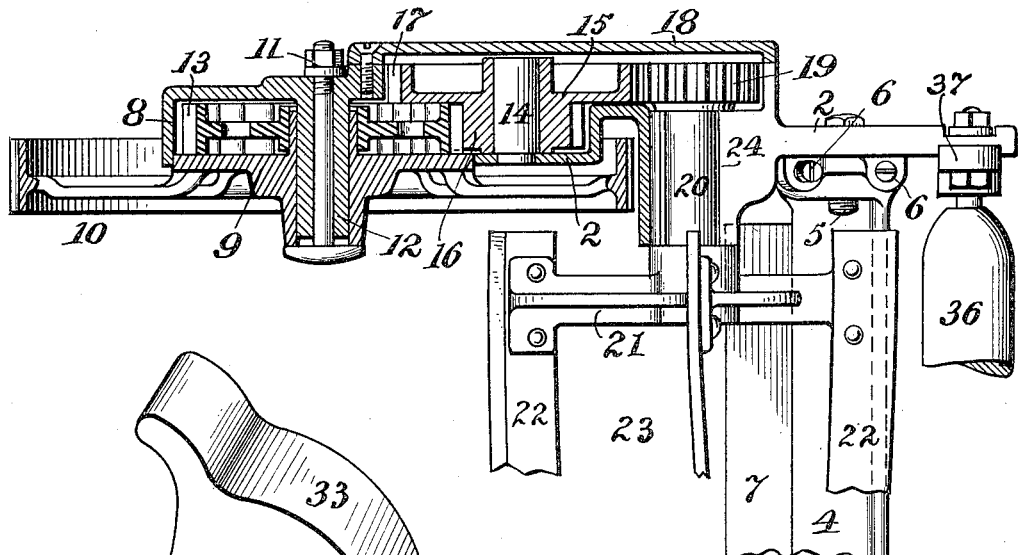
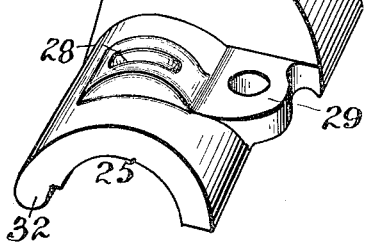
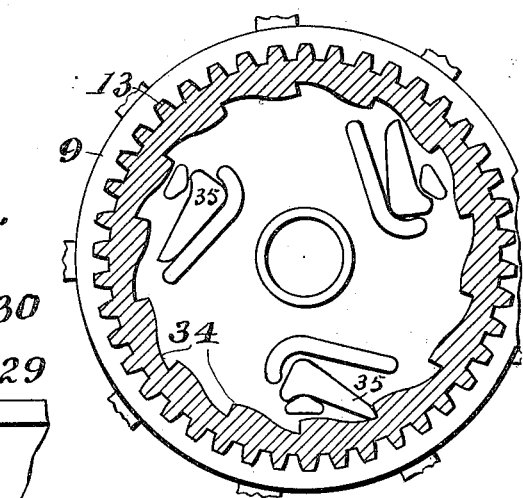

UNITED STATES PATENT OFFICE.

WALTER E. GRAHAM, OF PHILADELPHIA, PENNSYLVANIA.

LAWN-MOWER.

1,036,608.  Specification of Letters Patent.  Patented Aug. 27, 1912.

Application filed September 10, 1910. Serial No. 581,356.

*To all whom it may concern:*

Be it known that I, WALTER E. GRAHAM, a citizen of the United States, and a resident of the city of Philadelphia, county of Philadelphia, State of Pennsylvania, have invented an Improvement in Lawn-Mowers, of which the following is a specification.

My invention has reference to lawn mowers and consists of certain improvements which are fully set forth in the following specification and shown in the accompanying drawings which form a part thereof.

The object of my invention is to provide a construction of lawn mower which shall embody great simplicity, capacity for easy dismantling and assemblage, and a minimum number of parts and of points requiring adjustment; and especially embodying in its make-up, a form in which there is no obstruction immediately in front of the revolving cutter, so that the long grass is not bent down in front of the revolving cutter as the lawn mower is advanced toward it, the result being that the grass is cleanly and positively cut to a definite height.

My invention consists of certain features of construction which are fully described hereinafter and more particularly defined in the claims.

Referring to the drawings; Figure 1 is a plan view of a lawn mower embodying my invention; Fig. 2 is a sectional elevation of the same; Fig. 3 is a sectional plan view of a portion of the same on a level with the bearings of the main driving wheels and rotary cutter; Fig. 4 is a vertical cross section through the bearing of the revolving cutter; Fig. 5 is a perspective view of the removable part of the bearing for the revolving cutter; and Fig. 6 is a sectional elevation of the gear driven by the driving wheel and the pawl mechanism for driving it.

2 represents side frames, each of which contains the driving gearing and other operating parts for the revolving cutter and said frames are rigidly connected at a distance apart by the transverse bar 3 which is arranged at an elevation above the revolving cutter 23, and moreover at a point to the rear of the front of the cutting blades of the revolving cutter as they advance in their cutting operation. These side frames 2 are further rigidly connected together by the stationary cutter 7 and its supporting frame 4, which latter is fastened at each end by screws 5 to the side frames, with capacity for adjustment about the said screws 5 by means of the usual adjusting screws 6 carried by the said side frames. In this manner, the fixed cutter bar 7 forms a positive connection for holding the two frames 2 together, while at the same time permitting of adjustment of the cutter bar 7, whereby it is made to properly coöperate with the cutting blades 22 of the revolving cutter 23.

Each of the side frames 2 is provided with chambered portions 8 for receiving the gearing 13 and 15, the openings into the said frames for the said gearing being from opposite sides. The chambered portions have inwardly directed studs 12 upon which the disk shaped hubs 9 of the driving wheels 10 are journaled, as is clearly shown in Fig. 3, and said driving wheels are retained in operative position by means of bolts 11 which extend through the said studs 12 and act to hold the driving wheels in place. When the driving wheels are in position, the circular plate hubs thereof close the inner openings to the chambers 8, as is clearly indicated in Figs. 2 and 3. Loosely journaled concentric with the stud 12 and preferably upon an inward extension of the hub 9 of the driving wheel 10 is a gear wheel 13 which is provided with a recessed face having inwardly directed ratchet teeth 34, as shown in Figs. 3 and 6. Pivoted pawls 35 loosely carried on the inner face of the disk-shaped hub 9 engage the ratchet teeth 34 of the gear 13 and drive the same as the lawn mower is pushed forward. In this manner, the gear 13 is positively rotated when the machine is driven forward, but is not rotated when the machine is pulled backward. Arranged in the chamber 8 and placed therein from the opposite opening thereto, is the cone gear 15 which comprises a pinion 16 arranged to mesh with the gear 13 and having the large gear 17 which drives the pinion 19 of the revolving cutter 23. This cone gear 15 is journaled upon a stud 14 secured to the frame 2 and projecting laterally therefrom, as shown in Fig. 3.

18 is a plate which is removably secured over the open side of the chamber 8 on the outer part, to shield the cone gear 15 and the pinion 19. Both sides of the machine are provided with similar frames and gearing and differ only in the fact that one is right-handed and the other left-handed, as will be readily appreciated from the examination of Fig. 1.

The revolving cutter 23 consists of a plurality of spiral cutter blades 22, riveted near each end to heads 21 which are provided with journals 20 to which are secured the pinions 19. These journals 20 are formed rigid with the heads 21 and do not extend between the said heads 21. The cutter blades 22 may be further braced by light spiders 21ª riveted to the blades and arranged at intervals apart over the length of the revolving cutter. In this way a light cutter is provided and an inexpensive construction is secured, since there is no shaft which is to be fitted to the various spiders and secured to them for the purpose of revolving the cutter blades, as has been heretofore customary. As the journals 20 are formed integral with the heads 21 by being cast therewith, they may be reasonably large to provide a durable bearing and moreover, there is no dependency upon keys or pins for driving the revolving cutter, as is necessary where a separate shaft is employed.

My improved revolving cutter is supported in the main frame 22 in an exceedingly simple and efficient manner which permits of easy adjustment and removal when desired. As will be understood by reference to Figs. 3, 4 and 5, the journal 20 rests in a grooved bearing 24 formed integral with the frame 2 and is held therein by the box 25 which forms the other half of the bearing in which the journal 20 revolves. The forward end of the box 25 is provided with a rounded hinge portion 32 which rests in a socket portion 31 in the main frame 2 and said hinge portion is parallel to the axis of the journal bearing 24. In this manner, the box 25 may be adjusted about the parts 31 and 32 as a hinge and is clamped rigidly in position by means of the screws 26 and 30. The screw 26 is carried in a rearwardly extending lug 27 from the main frame 2 and presses downward upon the box 25 to force it toward the journal 20. This box is provided with a longitudinal groove 28 with which the lower end of the screw 26 engages, so that while permitting adjusting of the box 25, its position longitudinal of the axis of the journal is fixed. The screw 30 is arranged to the rear of the journal and extends through a rearwardly extending flange 29 of the box and performs the function of limiting the adjustment of the box 25 toward the bearing 24 and thereby preventing too much friction being put upon the journal 20. In this manner, the box 25 is positively held in position of adjustment, and any degree of adjustment may be readily secured by adjusting the said screws 26 and 30. All compensation which may be necessary, because of the wear on the journals or bearings may, by means of the above described provision, be easily accomplished.

To enable the revolving cutter 23 to be easily removed, together with its journals 20 and pinions 19, the rear entrance into the chambered part 8 is left open, as will be understood by reference to Fig. 3, in which the box 25 is removed so that the pinion 19 and journal 20 is exposed from the rear. When the boxes 25 are removed, the revolving cutter, together with its journals and pinions, may be withdrawn from the rear and in that manner be removed as a unit, for the purpose of regrinding the cutter blades 22. It will be understood that, by having the lower bearing 24 rigid upon the frame 2 relatively to the fixed cutter bar 7, a novice may reassemble the machine and insure the revolving cutter being properly positioned in the main frame to secure the best results. In those prior constructions of machines in which the bearings for the revolving cutter are adjustable and must be removed when removing the cutter and again readjusted when assembling the machine, great difficulty is had in readjusting the said revolving cutter in the main frame so that it will bear the proper relation to the remaining parts to insure the best results. My present construction is especially adapted to secure the best results by eliminating all possibility of inaccurate adjustment, and therefore, the improvement is of exceptional importance because of this advantage, aside from the simplicity and economy of construction.

By constructing my revolving cutter of the curved blades connected at each end to spiders or heads 21 which are each firmly secured to the bearings 20 and the pinions 19, I provide a light construction of revolving cutter without a central shaft, and at the same time, by providing the long bearings and the driving gearing for each journal and spider or head, I am enabled to transmit power to the curved cutter blades at each end and thereby enable heavy duty to be performed by the light cutter construction without fear of twisting the cutters out of shape, such as would result in a structure of this character where the driving was done wholly from one end. Where the revolving cutter has been driven from one end, it has been necessary in all cases of practical use to provide a transverse shaft for the cutter to guard against the torsional action of twisting the cutter blades out of shape and thereby making them fail to accurately coöperate with the fixed cutter 7.

To shield the pinion 19, I provide the box 25 with a shield 33 which, when the box 25 is in position, fits over the rear and inner side of the pinion 19 and thereby shields it from view. It also prevents the possibility of obstructions or dirt from entering the gearing. By providing the shield upon the box 25, the shield is always in proper position whenever the box is in use to retain the journal in operative position; and is always removed whenever the box has been removed for the purpose of removing the revolving cutter from the main frame. It will also be observed that by my improved construction, the revolving cutter may be readily removed with a few moments work and without in any way disturbing the fixed relation of the main frame and the remaining parts of the machine.

The rear ends of the main frame 2 may be provided with vertically adjustable brackets 37, in which are journaled the rear supporting roller 36 which determines the height above the ground of the fixed cutter bar 7, and hence determines the height of the cut grass which is left standing. This adjustable roller may be arranged in any suitable manner.

38 is the handle and is connected with the side frames by the bent bars 39, the same engaging lugs 40 at each side of the machine. The handle may be applied in any suitable manner and hence the particular construction shown is not essential.

By examination of Fig. 1, it will be seen that the entire front of the revolving cutter 23 is unobstructed, as there is no transverse shaft or rod upon which the main driving wheels 10 are journaled or supported. In this manner, the grass which is received between the two driving wheels 10 is received directly by the revolving cutter in a standing condition, and this is especially important where the grass is long or where among the grass are weeds and wild growths which extend above the normal height of the grass. Where the cross bar or shaft is employed between the driving wheels, it invariably comes at such a height from the ground that the grass is bent forward and leans away from the revolving cutter bar and in the most undesirable position for the said cutter bar to operate upon it to insure a sharp clean cut and therefore it happens that the machine has been frequently clogged, the duty upon the cutter is excessive and the result is that the lawn has a more or less ragged appearance owing to the fact that considerable of the lawn grass is not properly cut by the cutters. By my improvement, all of the grass reaches the cutters in an erect position and is properly engaged by the revolving cutter to present it to the stationary cutter in such a manner that its clean sharp severance is insured. It will also be understood that, because of the omission of any cross bar or shaft in front of the revolving cutters, I am enabled to reduce the diameters of the driving wheels 10 to a minimum and thereby produce a machine of light construction so that there is no waste of power necessary in moving the weight of the machine, and consequently with a given amount of energy, a greater area of grass may be cut. In practice, I form the entire machine of steel so that all of the parts are as light as possible, consistent with strength; and my aim has been to reduce the number of parts to a minimum and so arrange them that every part may be readily accessible and removable without disturbing the remaining parts and so that dismantling and assembling to any degree may be performed by an inexperienced person without detriment to the future use of the machine.

It will be observed that by simply removing the bolt 11, the driving wheel 10 and the sprocket wheel and gear 13 may be removed from the main frame without disturbing any of the other parts. It will also be seen that by removing the cover or cap 18, the cone gear 15 may be readily withdrawn from the main frame without disturbing any of the remaining parts. This is only possible, due to the fact that the cone gear 15 is removable from the opposite side of the frame 2 to that from which the main driving wheel 10 and gear 13 is removed, and hence the chambered portion 8, having oppositely directed openings for the removal of these gears from opposite sides while permitting the gears to engage in use, is an important element in the make-up of the side frames. It is thus seen that all of the gears in the main frame may be independently and readily removed without interfering with each other on either or both sides of the machine, and as I have before pointed out, the revolving cutter, together with its journals and pinions, is independently removable, it is seen that all the operative parts have exceptional capacities for dismantling and assemblage which absolutely preclude a possible error on the part of the most ignorant person. It is also evident that if necessary, the fixed cutter and its bar 4 may be readily removed by removing the screws 5, so that even this part may also be removed independently, without in any way interfering with the remaining parts and even when removed, the side frames 2 will still be held in rigid relation by means of the fixed transverse bar or rod 3.

I have now described my improvements in the particular form in which I have found them most excellently adapted for commercial purposes, and while I prefer the details of construction shown, I wish it to be understood that I do not restrict myself thereto, as the details may be modified without departing from the spirit of the invention.

Having now described my invention what

I claim as new and desire to secure by Letters Patent is:—

1. In a lawn mower, the combination of a side frame having a chamber provided with oppositely directed openings each having outwardly directed fixed studs, a main driving wheel having its hub portion journaled on one of the studs in the chamber of the side frame and extending from one opening, a bolt extending through the stud and having an extended head for removably holding the driving wheel in position on the side frame, a gear also located in the same chamber and upon the hub of the driving wheel and removable through the same opening, a cone gear arranged within the chamber and journaled upon the other stud and removable from the opposite opening and having its small gear adapted to be driven by the first mentioned gear, a removable cover over the opening providing access to the cone gear, and a revolving cutter having a journal journaled in the side frame and also provided with a pinion engaging the large gear of the cone gear, a removable box for retaining the journal of the revolving cutter in position and having a shield to cover the pinion and the engaging portion therewith of the cone gear, and means for adjusting and clamping the box in position upon the side frame.

2. In a lawn mower, the main frame and driving wheels and gearing carried thereby, in combination with a revolving cutter formed at each end with an integral journal and pinion, the pinions arranged to be driven from the gearing and the journals rotatably supported on the main frame, detachable boxes for the journals for holding them in position on the main frame, said boxes being provided with shield portions for shielding the pinions, and adjustable clamping devices for adjusting the boxes or permitting their removal for the purpose of removing the revolving cutter together with journals and pinions.

In testimony of which invention, I hereunto set my hand.

WALTER E. GRAHAM.

Witnesses:
WILLIAM RITCHIE,
NEWTON F. CRESSMAN.

Copies of this patent may be obtained for five cents each, by addressing the "Commissioner of Patents, Washington, D. C."